United States Patent [19]

Souda et al.

[11] Patent Number: 4,827,705
[45] Date of Patent: May 9, 1989

[54] VEHICLE FOR AERIAL WORKING

[75] Inventors: Takeshi Souda, Setagaya; Kenichi Matsuoka, Kariya, both of Japan

[73] Assignees: Toyota Jidosha Kabushiki Kaisha; Kabushiki Kaisha Toyoda Jidoshokki Seisakusho, both of Aichi, Japan

[21] Appl. No.: 35,884

[22] Filed: Apr. 8, 1987

[30] Foreign Application Priority Data

Apr. 16, 1986 [JP] Japan .................. 61-58092

[51] Int. Cl.⁴ .......................................... A01D 46/00
[52] U.S. Cl. ........................................ 56/328.1; 193/7
[58] Field of Search ............... 56/328.1, 334, 336, 56/340, 329, 332, 340.1; 193/7, 15, 25 R, 25 C, 32, 25 S

[56] References Cited

U.S. PATENT DOCUMENTS

| | | | |
|---|---|---|---|
| 1,491,235 | 4/1924 | Hicks | 56/336 |
| 2,097,527 | 11/1937 | Melown | 56/336 |
| 2,450,152 | 9/1948 | Miller | 193/7 |
| 2,881,030 | 4/1959 | Troche | 56/328.1 |
| 3,077,720 | 2/1963 | Grove et al. | 56/328.1 |
| 3,182,827 | 5/1965 | Frost | 193/7 |
| 3,428,156 | 2/1969 | Charyn et al. | 193/25 R |
| 3,565,225 | 2/1971 | Fay | 193/7 |
| 3,953,960 | 5/1976 | Craven | 56/328.1 |
| 4,109,449 | 8/1978 | Gibson | 56/328.1 |
| 4,258,825 | 3/1981 | Collins | 182/14 |
| 4,476,670 | 10/1984 | Ukai et al. | 56/328.1 |

Primary Examiner—Paul J. Hirsch
Attorney, Agent, or Firm—Oliff & Berridge

[57] ABSTRACT

A vehicle for aerial working has a vehicle chassis having a front frame and a rear deck, a lift mechanism disposed on the front frame, a platform vertically movably supported by the lift mechanism and having a cab thereon, a box-shaped pallet disposed on the rear deck of the chassis, and a chute for guiding picked fruits from a tall tree into the pallet. A lower end of the chute is attached to the pallet and an upper end of the chute is movably supported by the platform. The picked fruits drop within the chute and collected within the pallet. Then, the collected fruits are carried by driving the vehicle within the cab.

1 Claim, 2 Drawing Sheets

VEHICLE FOR AERIAL WORKING

BACKGROUND OF THE INVENTION

1. Field of the Invention

The present invention relates to a vehicle for an aerial working, and more particularly to a simple-structured vehicle suitable for pruning roadside trees and picking fruits in an orchard field.

2. Description of the Prior Art

A conventional vehicle for an aerial working has an extendible boom provided on a rear deck thereof, an aerial platform supported at a desired position in the air by the extendible boom, and outriggers for maintaining a stable equilibrium of the vehicle when the boom is extended.

The conventional vehicle for aerial working having the above described construction requires a highly extendible large sized boom, and accordingly, the construction of the vehicle becomes comparatively complex and expensive. In addition, the weight of the vehicle is increased due to the provision of the outriggers. This results in that such a vehicle cannot be used on soft ground such as an orchard field.

In the vehicle for aerial working for pruning roadside trees and picking fruits off from comparatively low trees, the operable height of 3 to 5 m is sufficient for such uses. Under the above circumstances, a simple-structured inexpensive vehicle for aerial working capable of operating at such operable height has been demanded.

SUMMARY OF THE INVENTION

It is an object of the present invention to provide a simple-structured and inexpensive vehicle for aerial working by improving a chassis of the vehicle.

The vehicle for aerial working according to the present invention has a lift mechanism provided on a front frame of a chassis of a vehicle, a platform supported by the lift mechanism, a vehicle control unit provided on the platform, a box-shaped pallet disposed on a rear deck of the chassis, and a chute for guiding picked things into the box-shaped pallet, of which the lower end is attached to the box-shaped pallet and the upper end is movably supported by the platform.

The vehicle for aerial working having the above described construction can be provided easily and inexpensively by altering the chassis of the vehicle. Furthermore, the operability of the vehicle for aerial working having the above described construction is excellent.

DETAILED DESCRIPTION OF THE EMBODIMENTS

Figure 1:
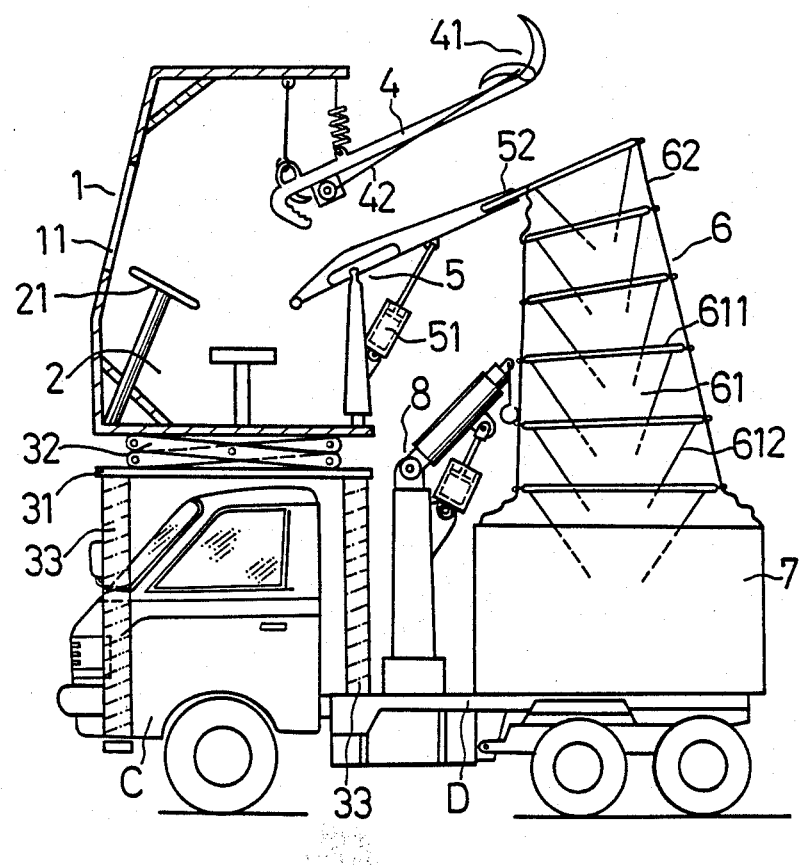
FIG. 1 is a side view of one embodiment of an overall vehicle for aerial working according to the present invention.

FIG. 1 shows one embodiment of a vehicle for aerial working according to the present invention, which is used for picking fruits.

An aerial platform 1 is provided above a roof of a cab C of a small-sized cab over engine truck. The aerial platform 1 has a box like shape, of which the rear side is open while the front side is formed into a front window 11. And a driver's seat 2 is provided on the front side of the aerial platform 1.

A steering wheel 21 is connected to a power steering mechanism within the cab C in parallel by way of flexible hydraulic pipes(not shown). And operation apparatuses for driving a vehicle, such as an accelerator are connected to a control unit within the driver's cab C in parallel by means of flexible wires.

The aerial platform 1 is supported by a lift mechanism 32 provided on a base plate 31 disposed along a roof of the driver's cab C. The lift mechanism 32 has an X link which is extended or folded by a hydraulic cylinder(not shown) to ajust the height of the aerial platform 1. The base plate 31 is supported by supports 33 standing at four corners of the outer periphery of the driver's cab C.

A recoilless power cutter 4 is suspended from the aerial platform 1. The power cutter 4 which is on the market is composed of a pair of arc-shaped cutting edges 41 which are provided at a tip end of a rod-shaped base body. One of the arc-shaped cutting edges 41 is movable by a link rod 42.

A control arm 5 having a cylinder 51 is provided at a rear end portion of the aerial platform 1. By manually operating the control arm 5, a tip end 52 of the arm 5 can be freely moved through the cylinder 51.

The tip end 52 of the control arm 5 is attached to an upper end of the chute 6 while a lower end of the chute 6 is attached to a box-shaped pallet 7 disposed on a truck deck D.

The chute 6 is composed of a plurality of shock absorbable members 61 which are vertically arranged at intervals and connected to each other by means of ropes 62. The shock absorbable members 61 are formed into similar conical shapes, respectively, so that the diameter of the upper end of each of the shock absorbing members 61 is gradually increased downwards.

Retaining ring members 611 are secured to the ropes 62. A side wall portion 612 downwards extending from each of the retaining ring portions 611 is circumferentially divided into a plurality of wall pieces. The lower portion of each side wall portion 612 is throttled by means of spring members to form an opening of a small diameter. The diameter of this opening is made smaller than that of fruits to be picked.

A lift 8 is provided on a vehicle frame for changing an old pallet 7 filled with picked fruits to a new empty one.

And double axles and double tires are used in a rear axle shaft for decreasing the tire pressure when being in contact with ground.

Furthermore, an autolevelizer may be provided for stabilizing the aerial working in an uneven orchard field.

In operation, when fruits are picked by the vehicle for aerial working having the above described structure, the aerial platform 1 is lifted to a proper height and the fruits are cut off by the power cutter 4 and drip within the chute 6. The dropping fruits enlarge the openings of the shock absorbable members 61 and pass therethrough to produce friction. Due to this friction, the dropping energy of fruits is absorbed and fruits are collected within the pallet 7 without being damaged due to shock. Then, the collected fruits are carried by driving the vehicle according to the present embodiment on the driver's seat 2.

Thus, according to this embodiment, the vehicle for aerial working uses a light truck as its base, and accordingly is of a light weight. And a single vehicle for aerial working can both collect and carry picked fruits.

Furthermore, according to this embodiment, by slightly modifying an ordinary truck, a useful vehicle having a simple structure can be obtained inexpensively.

Figure 2:
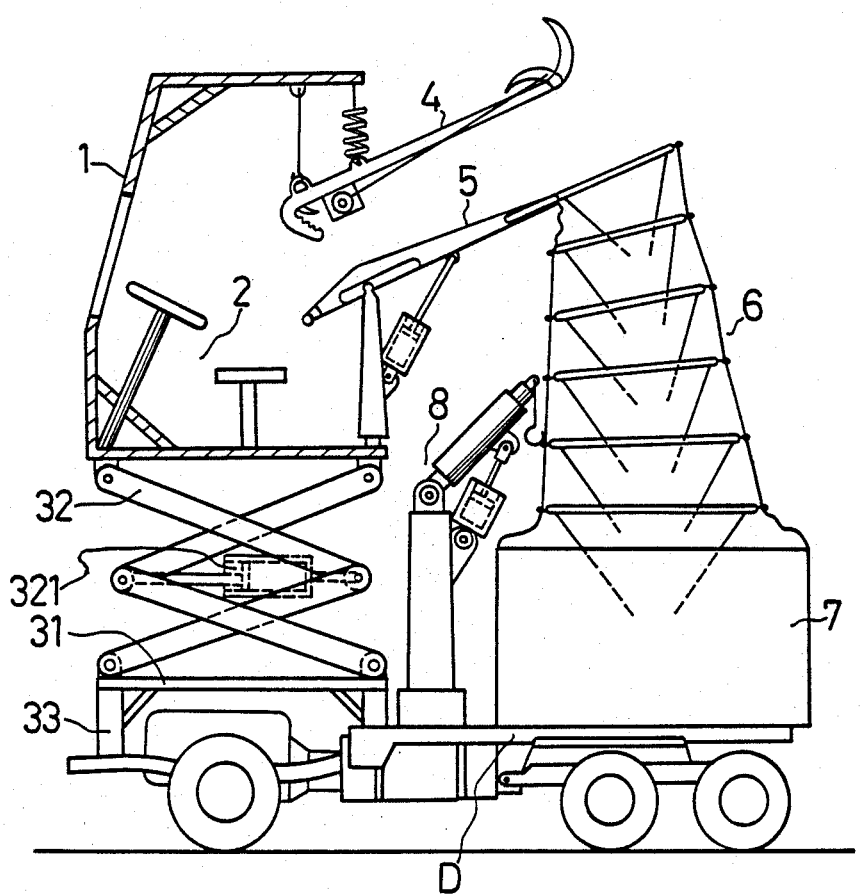
FIG. 2 is a side view of another embodiment of the vehicle for aerial working according to the present invention.

FIG. 2 illustrates another embodiment of the vehicle for aerial working according to the present invention. In this embodiment, the aerial platform 1 also serves as a cab for vehicle.

In FIG. 2, a base plate 31 is supported by supports 33 standing on a front frame of a truck chassis so as to be positioned above an engine room. A lift mechanism 32 provided on the base plate 31 supports an aerial platform 1.

In operation, the lift mechanism 32 is extended by means of a hydraulic cylinder 321 as shown in FIG. 2 and fruits are picked off. Then, the lift mechanism 32 is folded so that the aerial platform 1 descends. In this state, the collected fruits are carried.

In preceding embodiments, by using low pressure tires of a light weight and a large contact area, the obtained vehicle can be also used on softer agricultural land.

The vehicle for aerial working according to the present invention can be also suitably used in the pruning operation of roadside trees or the like. In this case, an ordinary cylindrical chute can be used.

And according to the present invention, an ordinary automobile chassis other than the truck chassis shown in the preceding embodiments, can be used.

In the preceding embodiments, the shock absorbable members 61 have increased diameters from an upper one to a lower one. This results in such shock absorbable members being compactly folded, and accordingly, a large space being unnessesary for accomodating folded absorbable members 61.

What is claim is:

1. A vehicle for aerial working comprising:
   a vehicle chassis having a front frame and a rear deck;
   a cab provided on said front frame with a vehicle control unit;
   a base plate supported by supports standing on said front frame above a roof of said cab;
   a lift mechanism provided on said base plate;
   a platform vertically movably supported by said lift mechanism;
   vehicle control means for remotely controlling movement of said vehicle provided on said platform;
   a box-shaped pallet disposed on said rear deck; and
   a chute for guiding things to be picked from a position in the air and dropped into said pallet; a lower end of said chute being attached to said pallet;
   said platform further including a cutter for picking things and a control arm for movably supporting an upper end of said chute and controlling the position of said upper end of said chute;
   said vehicle control means being connected in parallel to the vehicle control unit provided within said cab.

* * * * *